(12) United States Patent
Kilian et al.

(10) Patent No.: US 10,379,722 B2
(45) Date of Patent: Aug. 13, 2019

(54) AUTOMATED CREATION OF SUITABLE PREFERENCE MENUS FOR FIELD DEVICES

(71) Applicant: Endress + Hauser GmbH + Co. KG, Maulburg (DE)

(72) Inventors: Markus Kilian, Merzhausen (DE); Andrea Seger, Zell i. W. (DE); Bert Von Stein, Zell i. W. (DE); Christian Wandrei, Weil am Rhein (DE)

(73) Assignee: ENDRESS+HAUSER SE+CO.KG, Maulburg (DE)

( * ) Notice: Subject to any disclaimer, the term of this patent is extended or adjusted under 35 U.S.C. 154(b) by 496 days.

(21) Appl. No.: 14/819,677

(22) Filed: Aug. 6, 2015

(65) Prior Publication Data

US 2016/0041743 A1 Feb. 11, 2016

(30) Foreign Application Priority Data

Aug. 8, 2014 (DE) .................. 10 2014 111 350

(51) Int. Cl.
*G06F 3/0484* (2013.01)
*G06F 3/0482* (2013.01)
*G06Q 30/06* (2012.01)

(52) U.S. Cl.
CPC ........ *G06F 3/04847* (2013.01); *G06F 3/0482* (2013.01); *G06F 3/04842* (2013.01); *G06Q 30/0641* (2013.01)

(58) Field of Classification Search
CPC ........ G05B 2219/25428; G05B 19/042; G05B 19/0426; G05B 19/0423; G05B 2219/31121; G06F 3/04847; G06F 3/0482; G06F 3/04842; G06Q 30/0641
See application file for complete search history.

(56) References Cited

U.S. PATENT DOCUMENTS

| | | | | |
|---|---|---|---|---|
| 6,094,600 A * | 7/2000 | Sharpe, Jr. | ......... | G05B 19/0423 700/19 |
| 7,191,411 B2 | 3/2007 | Moehrle | | |
| 2005/0039162 A1 * | 2/2005 | Cifra | ..................... | G06F 3/0486 717/105 |

(Continued)

FOREIGN PATENT DOCUMENTS

| DE | 10351751 A1 | 6/2005 |
|---|---|---|
| DE | 10392790 T5 | 7/2005 |

(Continued)

OTHER PUBLICATIONS

German Search Report, The German Patent Office, Munich, DE, dated May 12, 2015.

*Primary Examiner* — Tadesse Hailu
(74) *Attorney, Agent, or Firm* — Bacon & Thomas, PLLC

(57) ABSTRACT

A method for creating a preference menu for a field device is described, wherein the field device can be parameterized and configured by means of a large number of parameters. The method involves compiling a device specification for the field device indicated by the customer for an order and, optionally, further customer specifications as a preference menu, which incorporates a selection of preferred parameters, which are particularly relevant to the respective device specification for the field device, and storing the preference menu with a selection of preferred parameters in a memory of the field device.

14 Claims, 4 Drawing Sheets

(56) References Cited

U.S. PATENT DOCUMENTS

| | | | | |
|---|---|---|---|---|
| 2006/0150081 A1* | 7/2006 | Seger | G05B 19/042 | 715/234 |
| 2006/0206659 A1* | 9/2006 | Anne | H01L 21/76885 | 711/100 |
| 2006/0229738 A1* | 10/2006 | Bhandiwad | G05B 19/4185 | 700/9 |
| 2007/0075916 A1* | 4/2007 | Bump | G05B 19/41845 | 345/3.1 |
| 2007/0077665 A1* | 4/2007 | Bump | G05B 19/41845 | 438/14 |
| 2007/0244584 A1* | 10/2007 | John | G05B 19/0421 | 700/86 |
| 2007/0250180 A1* | 10/2007 | Bump | G05B 19/41845 | 700/1 |
| 2008/0288933 A1* | 11/2008 | Budmiger | G01F 1/8431 | 717/168 |
| 2008/0320402 A1* | 12/2008 | Isenmann | G05B 19/4083 | 715/762 |
| 2009/0077055 A1* | 3/2009 | Dillon | G05B 23/0272 | |
| 2011/0022979 A1* | 1/2011 | Meier | G01D 1/00 | 715/810 |
| 2011/0191500 A1* | 8/2011 | Odayappan | G05B 19/0426 | 710/8 |
| 2011/0302511 A1* | 12/2011 | Chomik | G05B 19/4186 | 715/760 |
| 2012/0004743 A1* | 1/2012 | Anne et al. | G05B 15/02 | 700/83 |
| 2012/0035746 A1* | 2/2012 | Broom | G06Q 10/087 | 700/21 |
| 2012/0062577 A1* | 3/2012 | Nixon | G05B 23/0272 | 345/522 |
| 2012/0151504 A1* | 6/2012 | Schwalbe | H04L 12/40 | 719/321 |
| 2012/0159366 A1 | 6/2012 | Klein | | |
| 2012/0185065 A1* | 7/2012 | Fujii | G05B 15/02 | 700/83 |
| 2012/0246376 A1* | 9/2012 | Kolblin | G05B 19/4185 | 710/305 |
| 2013/0006399 A1* | 1/2013 | Tandon | G05B 19/0423 | 700/88 |
| 2013/0190902 A1* | 7/2013 | Itou | G05B 15/02 | 700/83 |
| 2013/0257627 A1* | 10/2013 | Rafael | G05B 19/042 | 340/691.6 |
| 2015/0135117 A1* | 5/2015 | Rajappa | G05B 19/4183 | 715/771 |
| 2015/0234381 A1* | 8/2015 | Ratilla | G05B 19/0426 | 702/104 |

FOREIGN PATENT DOCUMENTS

| | | |
|---|---|---|
| DE | 102007063312 A1 | 7/2009 |
| DE | 102010042999 A1 | 5/2012 |
| DE | 102010062661 A1 | 6/2012 |
| DE | 102012108865 A1 | 3/2014 |
| WO | 2005047994 A1 | 5/2005 |
| WO | 2009083422 A1 | 7/2009 |

* cited by examiner

US 10,379,722 B2

AUTOMATED CREATION OF SUITABLE PREFERENCE MENUS FOR FIELD DEVICES

TECHNICAL FIELD

The invention concerns a method for creating a preference menu for a field device. The invention also concerns a programming system for creating a preference menu for a field device. In addition, the invention concerns a field device and a fieldbus system with a field device and a host computer.

BACKGROUND DISCUSSION

Multiple field devices, which are used to record and/or control process variables, are utilized in process automation engineering. Examples of field devices of this type are level measurement devices, mass flow meters, pressure and temperature measurement devices, etc., which, as sensors, record the corresponding process variables, fill level, flow rate, pressure and temperature.

A variety of such field devices are manufactured and marketed by the Endress+Hauser company.

The operating mode of a field device is defined with the aid of parameters, which are written into the memory of the field device. The functioning of the field device is set by storing suitable parameter values in the respective memory locations. This process is referred to as "parameterizing". The customer sets the parameters and, by selecting suitable parameter values, the customer can adjust the field device to his particular application.

Particularly for easy to operate field devices, there is a great number of setting options and, consequently a large number of parameters, which are to be set by the customer. Some advanced field devices have several hundred parameters. In order to be able to set the parameters correctly, the customer must become acquainted with the importance of the individual parameters for each field device utilized. This is often made difficult, in addition, insofar as various manufacturers use a variety of parameters with different names for one and the same task.

SUMMARY OF THE INVENTION

The object of the invention is to simplify the parameterizing of field devices for the customer.

This object is achieved by. A method for creating a preference menu for a field device, which can be parameterized and configured by means of a large number of parameters, which involves compiling a device specification for the field device indicated by the customer for an order and, optionally, further customer specifications as a preference menu, which incorporates a selection of preferred parameters, which are particularly relevant to the respective device specification for the field device. The method also involves storing the preference menu in a field device memory with a selection of preferred parameters.

Based on the device specification for a field device indicated by the customer in the order, the manner in which the field device is intended to be utilized by the customer and what preferred parameters are required for this can be relatively easily identified. Hence, the device specification indicated by the customer in the order can be used to select the preferred parameters and to compose the preference menu. In this manner, a preference menu adapted to the device specification is created, which incorporates a selection of parameters matching the device specification and hence also the intended use of the field device. The preference menu created in this manner is stored in the memory of the field device.

Thus, the customer can already be provided with a compatible preference menu for the respective device specification with the most important parameters for the field device on the initial activation of the field device. As a result, the customer no longer has to grapple with all of the parameters of the field device as before. It is sufficient for the customer to deal with the parameters listed in the preference menu and set these parameters to appropriate values. When the parameters included in the preference menu are parameterized, the customer can assume that no essential parameters have been overlooked and that the field device can fulfill its function. In this respect, the selection of the parameters listed in the preference menu also serves as an operating instruction for the user, as to how parameterizing of the field device is to be performed. As a result, the initial training time for the customer on activation of the field device is markedly reduced in terms of time because the customer no longer has to grapple with all of the parameters and their relevance.

BRIEF DESCRIPTION OF THE DRAWINGS

In the following, the invention is outlined in more detail with the aid of exemplary embodiments depicted in the drawings. The drawings depict.

DETAILED DISCUSSION IN CONJUNCTION WITH THE DRAWINGS

Figure 1:
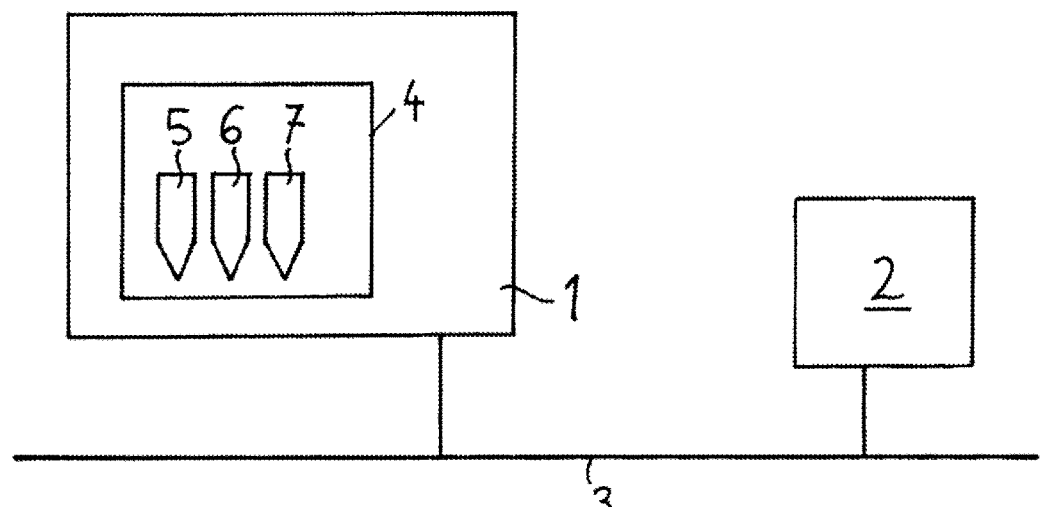
FIG. 1 shows a fieldbus system with a host computer and a field device.

FIG. 1 is intended to depict how the parameterizing of a field device is performed by the customer. For this purpose, a fieldbus system is represented in FIG. 1, which incorporates a host computer 1 and a field device 2. The host computer 1 and the field device 2 are connected to a field bus 3 and can exchange data with one another via the fieldbus 3. The fieldbus 3 is preferably a fieldbus in conformity with one of the standards, HART, Profibus, Fieldbus Foundation or in conformity with an industrial Ethernet protocol.

A device connectivity software 4, which enables access to parameters of the field device 2 by the host computer 1, is installed on the host computer 1 for parameterizing the field device 2. Preferably, the device connectivity software 4 is a framework application in conformity with the FDT (Field Device Tool) standard. A variety of individual device drivers or DTMs (Device Type Managers) 5 is integrated into this framework application, 6, 7, which serve as drivers for the various field devices and other components of the fieldbus system. For example, a device driver 5 is integrated into the device connectivity software 4, with which the field device 2 can be accessed. The field device 2 can be parameterized via the device connectivity software 4 and the device driver 5.

Figure 2:
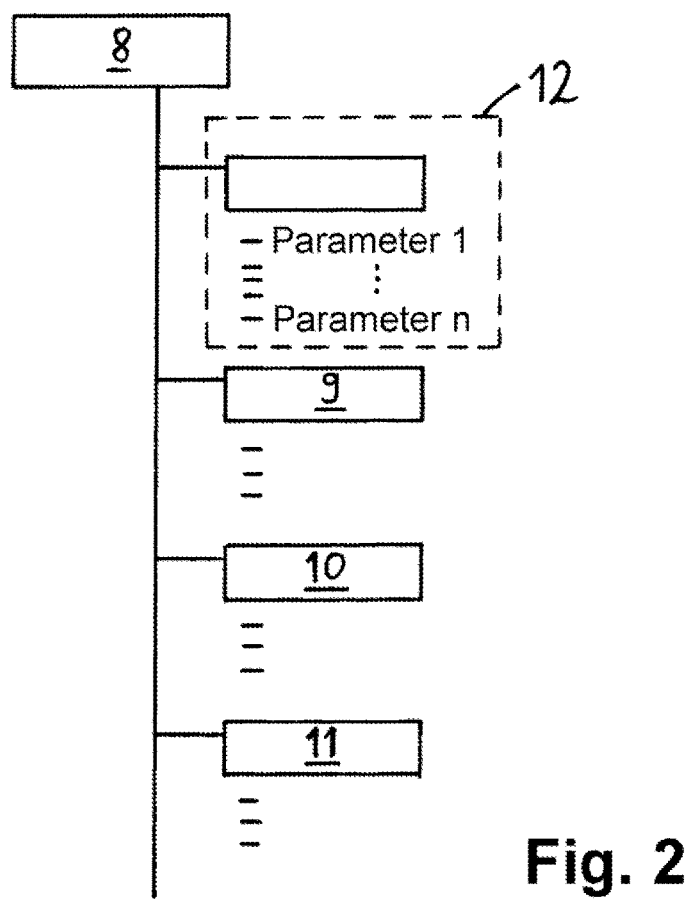
FIG. 2 shows a menu structure with a preference menu depicted in a highlighted section.

The various parameters of the field device 2 are represented on the display of the host computer 1, preferably in the form of a menu structure, using the device connectivity software 4 and the device driver 5. A menu structure of this type is depicted in FIG. 2. The various parameters of the field device are listed in a main menu 8 in a structured form, under different menu items 9, 10, 11. The user is able to view the current values of the individual parameters via the menu structure. The user is also able to set or change individual parameter values specifically from the host computer 1. Advanced field devices provide the user with a vast range of setting options. Thus, it can seem that a parameter, which is important to the user, is presented, hidden deep within the menu structure. So, it requires quite a bit of training for the user to identify the parameters important for the respective device specification and for his application and to set suitable values.

In order to provide facilitated access for the user to his important parameters, it is proposed that a display 12, comprising the most important parameters required by the user, be indicated in a highlighted location of the menu structure of a preference menu, in accordance with embodiments of the present invention.

By means of the display 12 of the preference menu in a highlighted location, the user is provided with a facilitated access to the most relevant parameters of the field device. If the user has dealt with the parameters listed in the preference menu and has set suitable values for these, he can assume that at least the most important settings for the successful operation of the field device have been made. In this respect, the parameters shown in the display 12 of the preference menu can serve as user guidance when parameterizing the field device, that is, as a quasi-operating instruction for the user. If the user has set the parameters contained in the preference menu, he can assume that no essential parameters have been overlooked and that the field device will perform its measurement task.

In order to achieve as broad as possible a reduction in workload for the customer, it is reasonable to deliver a field device to the customer, in which an appropriate and suitable preference menu for the respective field device, with a useful selection of preferred parameters, has already been stored by the manufacturer. In this manner, the customer can be supplied with a preference menu with a suitable selection of parameters as soon as the field device is activated. For the customer, this means a considerable reduction in workload because he need not familiarize himself with all the parameters of the field device.

Field devices are typically available with a multitude of different device specifications, in order that the features of the field device can be adjusted to the respective application and the prevailing conditions on-site. "Device specifications" denotes the different deliverable versions of a field device, from which the customer can select the suitable device, depending on the intended purpose, operating conditions and operating environment. It has become apparent that the respective device specification and the purpose of the field device have a significant influence on which parameters are of primary importance to the customer. By reference to the device specification for a field device indicated by the customer on ordering, the manner in which the field device is to be employed by the customer and which preferred parameters will be required for this can be relatively easily recognized.

In this respect, it is proposed that the device specification indicated by the customer on ordering be automatically compiled by the manufacturer as a suitable set of preferred parameters for the preference menu and that the preference menu created in this manner be stored in the field device prior to the delivery of the device. Thus, the customer can already be provided with a compatible preference menu for the respective device specification and for the respective purpose on the initial activation of the field device.

In the following, first of all, we intend to outline what is meant by device specifications in more detail, by reference to a field device for fill level measurement using guided radar (Levelflex device range by the Endress+Hauser company).

Device Specifications of a Field Device for Measuring the Fill Level by Means of Guided Radar 1. Communication Type Generally, there are various device specifications for a field device for the various fieldbus standards. A fill level measurement device, for example, can be obtained for the following fieldbus standards:

HART
Profibus PA
Fieldbus Foundation

2. Tank Type

The type of tank in which the fill level measurement device is used is requested by means of the "Tank Type" parameter. This has the following options:

Bypass pipe
Surge pipe
Spherical tank
Storage tank
Process tank

If the fill level measurement device is utilized in a bypass pipe or in a surge pipe, the diameter of the bypass pipe or surge pipe is required for a correct evaluation of the measurement results. Hence, it is necessary to set the "Pipe Diameter" parameter for the "Bypass Pipe" or "Surge Pipe" tank type. In these cases, a pipe diameter becomes an important parameter, which should be incorporated into the preference menu.

3. Flange Type

There are measurement applications in the area of fill level measurement, for which the medium is at a normal ambient temperature. There are also measurement applications, however, for which the fill level of a hot medium is to be measured. A special device specification is required for high-temperature applications, for which, by means of a special flange for this purpose, it is ensured that the fill level measurement device is attached with a certain minimum clearance from the installed location because the installed location becomes very hot under certain circumstances. In this respect, there are two options for the "Flange Type" parameter:

Normal temperature
High temperature

4. Antenna Type

Field devices for fill level measurement based on guided radar can either have a fixed rod antenna or a steel cable antenna. For fill level measurement of corrosive media, device specifications with a coated rod or coated cable can also be provided. In addition, device specifications with a double rod or double cable are also available. In this respect, the "Antenna Type" parameter can have the following values:

Rod
Cable sensor

Coated rod
Coated cable
Double rod
Double cable

If a cable antenna is used, there is the option of attaching the cable sensor to the floor of the tank with the aid of guy wires in order to secure the cable sensor. Because of the conductive connection to the floor of the tank, the cable sensor is also grounded by this anchoring. If the "Antenna Type" parameter is set to "Cable Sensor", the "Sensor Grounded" parameter, which can be set to "Yes" or "No", therefore, also becomes relevant. Hence, if the antenna type is set to "Cable Sensor", the "Sensor Grounded" parameter is also incorporated into the preference menu.

5. Operating Mode

In addition to purely fill level measurement, a fill level measurement device based on guided radar can also be utilized to measure separation layers. For example, a layer of oil can be found on the surface of a liquid, the thickness of which should be measured. The "Operating Mode" parameter can thus be set to the following values:

Fill level (Level)
Separation layer (Interface)

Depending on whether the fill level measurement device is to be used in the "Fill Level" operating mode or in the "Separation Layer" mode, further parameters then become important.

5.1. Fill Level Measurement Operating Mode

In the case of a pure fill level measurement, the user can stipulate fill level measurement adjustments for the fill level value measured. In particular, with the aid of the "Fill Level Adjustment Empty" and "Fill Level Adjustment Full" parameters, the user can specify the fill level at which the tank is regarded as "empty" or "full".

The user can also stipulate whether he would like to have the fill level displayed in units of length or in units of volume. If the user decides in favor of a display in units of volume, the fill level measured must be converted into an appropriate fill volume. For tanks, for which the cross-section of the tank remains constant as a function of the fill level, a linear conversion of the fill level into the corresponding fill volume can be performed. This is the case, for example, for cylinder shaped or rectangular tanks. If, on the other hand, the cross-section of the tank varies as a function of the fill level, as is the case, for example, with a spherical tank or a conical tank, then there is a non-linear relationship between the fill level and the fill volume. In this case, a linearization table is used for the conversion of a fill level into a fill volume, which contains the corresponding fill volumes for a large number of different fill level values.

The user selects one of the different display options with the aid of the "Linearization Type" parameter. The "Linearization Type" parameter has the following settings options:

if the fill level in should be displayed in units of length, the "Linearization Type" parameter is set to "No Linearization".
if the fill level in should be displayed in units of volume and the relationship between the fill level and the fill volume is linear, the "Linearization Type" parameter is set to "Linear".
if the fill level should be displayed in units of volume and the relationship between the fill level and the fill volume is non-linear, a linearization table is required. In this case, the "Linearization Type" parameter is set to "Table". When the "Linearization Type" parameter is set to "Table", a "Linearization Table" submenu is displayed. The user can specify the respective corresponding fill volume value for different fill level values in this "Linearization Table" submenu. By interpolating this table, a conversion is made possible, even for a non-linear relationship between the fill level and the fill volume.

Hence, the "Fill Level Adjustment Empty", "Fill Level Adjustment Full", "Linearization Type" parameters, as well as the "Linearization Table" submenu are therefore relevant to the "Fill Level Measurement" operation mode. It is therefore advantageous for the "Fill Level Measurement" operation mode to incorporate the parameters and submenus referred to into the preference menu.

5.2. Separation Layer Management Operation Mode

If, on the other hand, the fill level measurement device is used to measure a separation layer, completely different parameters become the focus of interest. For example, with the aid of the "Separation Layer Characteristic" parameter, the type of separation layer which is to be measured can be specified. The "Separation Layer Characteristic" parameter has the following settings options:

Oil/Condensate
Standard
Sediment ("Sediment" denotes material deposits on the measuring probe.)

Where a separation layer is measured, it has to be done with two different media, namely the lower medium and the medium of the separation layer. As a rule, both media have different dielectric constants. In order to determine the thickness of the separation layer correctly, it is necessary to specify the "Dielectric Constant, Lower Medium" parameter. In the case of a separation layer measurement, the "Separation Layer Characteristic" and "Dielectric Constant, Lower Medium" parameters are therefore important and should be incorporated into the preference menu.

5.3 Display Parameters for Fill Level and Separation Level Measurements

Up until now, primarily settings parameters have been discussed, that is, parameters, which are set by the user to a certain value in order to operate the field device in a certain desired manner. As well as the settings parameters, there are the so-called display parameters, which are used to display the measurement values and status information of the field device. In addition to the preferred settings parameters, a selection of display parameters can also be incorporated into the preference menu. Here, in turn, the selection of preferred display parameters depends on the device specification and, in particular, the operation mode of the field device. As a rule, different display parameters from those for a separation layer measurement are required for a fill level measurement. In the cases of fill level measurement, for example, the preference menu can incorporate the following display parameters:

Fill level measured
Sensor Temperature
Signal Quality

In the case of a separation layer measurement, on the other hand, the measured separation layer would be incorporated into the preference menu instead of the fill level.

For example, a "Diagnosis" submenu, in which the preferred display parameters are summarized, could be provided in the preference menu for the display parameters.

The intention in the following is to illustrate, by reference to two examples, how a suitable preference menu with a suitable selection of preferred parameters can be drawn up, starting from the device specification ordered by the customer and further specifications, which are indicated in the order by the customer. The preference menu created in this way is stored in the memory of the field device prior to delivery to the customer and hence is already available to the customer on the initial activation of the field device.

FIRST EXAMPLE

In the first example, a customer orders a field device for fill level measurement using guided radar to measure the fill level in a spherical tank. The fill level measurement device should have a cable sensor as its antenna. The cable sensor should be guyed to the floor of the spherical tank, so the cable sensor is grounded. The fill level in the tank should be displayed in units of volume.

This information can now be compiled as a suitable preference menu for this device specification, which contains the most important parameters for these specifications. A suitable preference menu, for example, could look as follows:

Tank type: Spherical tank
 Antenna type: Cable sensor
 Sensor grounded: Yes
 Operation mode: Fill level (Level)
 Fill level adjustment full
 Fill level adjustment empty
 Linearization type: Table
 Linearization Table Submenu
 Diagnosis Submenu:
 Fill level measured
 Sensor temperature
 Signal quality Thanks to this preference menu, all important parameters for the device specification of the fill level measurement device ordered by the user are provided for him in a compact form in the preference menu. Thanks to the highlighted display of the preference menu, the customer is motivated to set the essential parameters for operating the field device immediately. For example, the user is motivated to set up the linearization table required for converting the fill level into a corresponding fill volume for the spherical tank and to wonder whether the cable sensor is grounded or not.

SECOND EXAMPLE

In the second example, a customer orders a fill level measurement device in accordance with the guided radar principle for a separation layer measurement. Here, the measurement should be made in the surge pipe of a tank. The fill level measurement device should have a rigid rod antenna, which extends into the tank, inside the surge pipe.

On the basis of this device specification and the specifications given by the customer in the order, a suitable preference menu for this field device is now compiled. A suitable preference menu, for example, could look as follows:

Tank type: Surge pipe
 Pipe diameter
 Antenna type: rod
 Operation mode: separation layer (Interface)
 Separation Layer Characteristics
 Dielectric Constant, Lower Medium
 Diagnosis Submenu:
 Separation layer measured
 Sensor temperature
 Signal quality This preference menu is stored in the field device by the manufacturer and is already available for the user on the initial activation of the field device. Thanks to this preference menu, the user is particularly motivated to deal with the parameters required for the separation layer measurement, for example the separation layer characteristics or the dielectric constants of the lower medium. Thanks to the highlighted display of the parameters included in the preference menu, the user is motivated to address the parameters required for the separation layer measurement and inputs the corresponding data.

A suitable preference menu is created by the manufacturer as follows: the device specification ordered by the customer and, potentially, further specifications provided by the customer are converted into a body of settings and display parameters appropriate to the device specification and the intended purpose by means of suitable allocation protocols.

This compiling of the device specification and, if required, still further customer specifications as a suitable preference menu can be performed completely automatically by the manufacturer with the aid of suitable allocation protocols and compilation rules. Preferably, the device specification and the customer specification are compiled by the manufacturer with the aid of a suitable programming system, wherein the automatically generated preference menu is immediately written into the nonvolatile memory of the field device.

Figure 3:
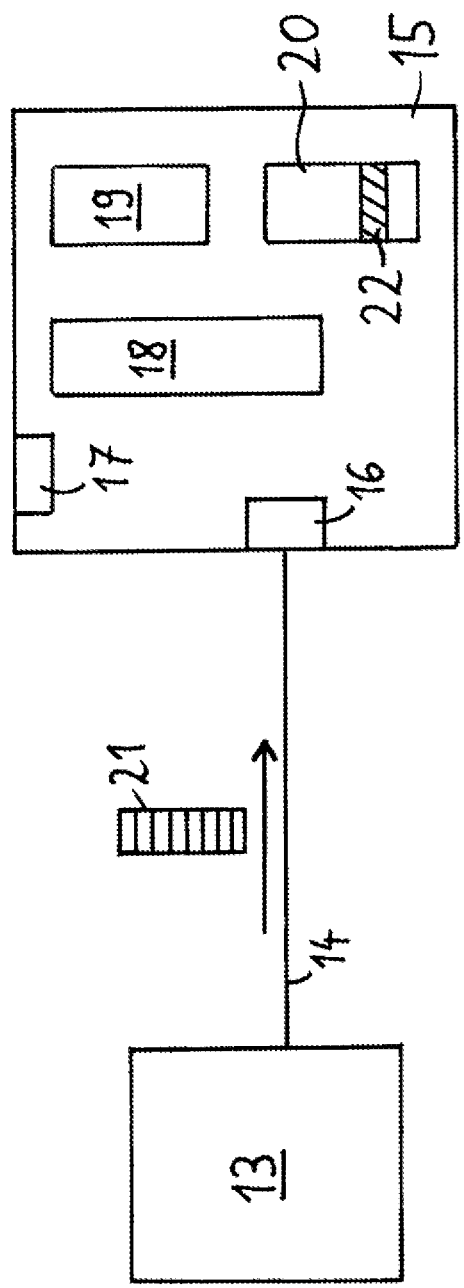
FIG. 3 shows a programming system installed by the manufacturer, with which a specifically compiled preference menu can be written to a memory of the field device.

A programming system of this type, for the automatic creation and storage of a preference menu is depicted in FIG. 3. With the aid of the programming system depicted in FIG. 3, a preference menu specifically adapted to the field device can be created by the manufacturer and stored in the field device. The programming system comprises a production computer 13, which is connected to a field device 15 via a data connection 14. Preferably, the production computer 13 is connected to the field device 15 via a production interface 16. Alternately, it would also be possible to connect the production computer 13 to the field device 15 via a fieldbus interface 17.

The field device 15 is equipped with multiple different memory systems and incorporates e.g. a flash ROM (Read Only Memory) 18, a RAM (Random Access Memory) 19 and an EEPROM (Electrically Erasable Programmable ROM) 20. The operating software for the field device is stored in the nonvolatile flash ROM 18. The RAM 19 is a volatile memory, in which, for example, the current measurement values are cached before these are transferred via the fieldbus as a telegram. The nonvolatile programmable EEPROM 20 can be programmed byte-wise. The serial number of the field device 15, for example, is stored in the EEPROM 20. Manufacturing data, adjustment data and comparison data, which are ascertained when the device is calibrated by the manufacturer, can also be stored in the EEPROM 20. A preference menu with a selection of preferred parameters, which is individually adjusted to the device specification for the field device 15, should now also be stored on this EEPROM 20.

The preference menu suitable for the respective device specification is automatically created by the production computer 13. For this purpose, the production computer 13 compiles the device specification ordered by the customer and, optionally, additional customer specifications as a suitable preference menu, which comprises a suitable selection of preferred parameters for the respective device specification. The device specification ordered by the customer and, if required, additional customer specifications can be described, for example, by means of a code provided for this purpose. The device specification and, if required, additional customer specifications are automatically compiled as a preference menu with a suitable selection of preferred parameters adapted to the field device by the production computer 13 with the aid of allocation protocols or allocation tables.

In this manner, a preference menu 21 is automatically created by the production computer 13, which is transferred to the field device 15 via the data connection 14 and the production interface 16. Here, the preference menu 21 is stored in a memory area 22 of the nonvolatile programmable EEPROM 20 provided for this purpose so that the field device 15 now incorporates its own preference menu 21, which is specifically adapted to the characteristics of the field device 15.

Figure 4:
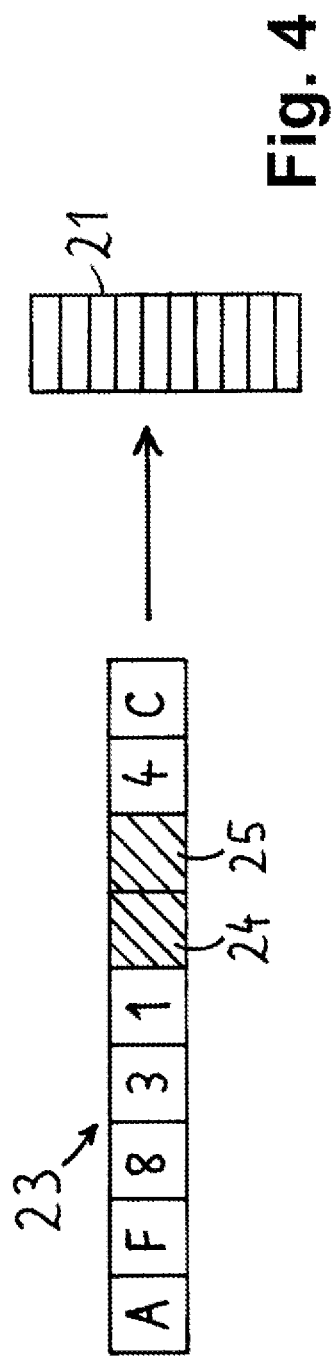
FIG. 4 shows compiling an order code as a dedicated preference menu with a selection of preferred parameters.

Preferably, the device specification of the field device ordered by the customer is indicated by means of an order code, which is recorded on ordering the field device. An order code 23 is depicted in FIG. 4, which, for example, consists of a series of numerals and alphanumeric characters. Each of the different device specifications of the field device is clearly described by a corresponding order code 23. Additional positions 24, 25 can be optionally provided in the order code 23, which can be used to encode additional customer specifications. For example, on ordering the field device, the customer can provide additional information concerning the intended purpose of the field device or concerning the intended range of measurement. In accordance with a preferred embodiment, it can also be provided that the customer can explicitly specify individual parameters, which should be included in the preference menu 21. On generating the preference menu 21, the information coded by the additional positions 24, 25 can then also be incorporated.

The order code 23 is compiled as a set of preferred parameters by the production computer 13 with the aid of allocation protocols or allocation tables. As depicted in FIG. 3, the preference menu 21 created in this manner is transferred to the field device 15 and is stored there in the EEPROM 20.

Figure 5A:
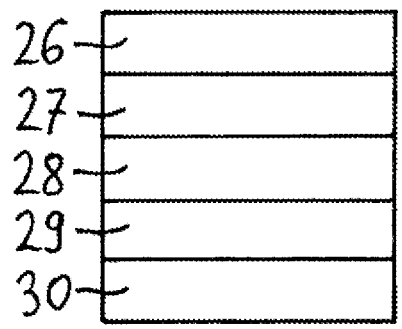
FIG. 5A shows a first embodiment of a preference menu.

The preference menu can be specified in the form of a list of preferred parameters. An embodiment of this type is depicted in FIG. 5A. In each case, the parameter IDs of the preferred parameters contained in the preference menu are listed in sequential memory locations 26-30 of the EEPROM 20. Thus, the preferred parameters contained in the preference menu can be specified.

Figure 5B:
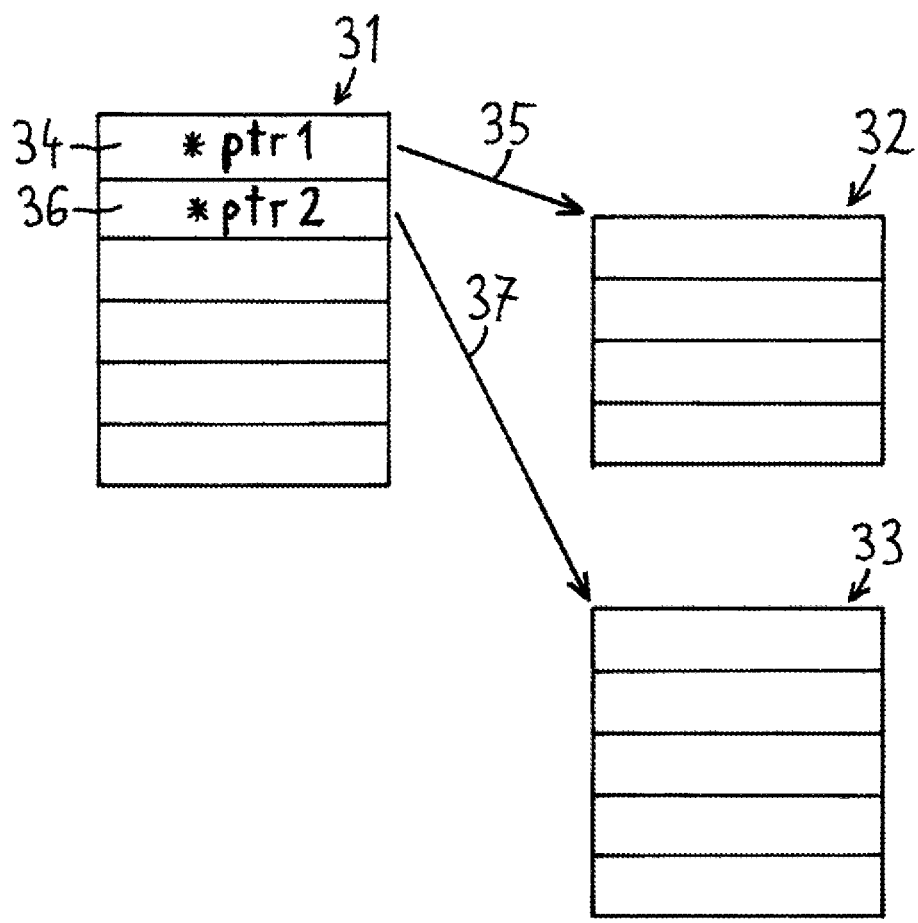
FIG. 5B shows an alternate embodiment of a structured preference menu, which includes one or more submenus.

Alternately, the preference menu can also be compiled as a structured menu with various submenus, as depicted in FIG. 5B. The preference menu depicted in FIG. 5B comprises a main menu 31 and two submenus 32 and 33. A preference menu structured in this manner can be stored in the EEPROM 20 of the field device 15 in the form of a linked list. For this purpose, pointers are placed in various memory locations of the main menu 31, which always point to the start address of submenu. A pointer 35 is placed at the memory location 34 of the main menu 31, which indicates the start address of the submenu 32, and a pointer 37 is placed at the memory location 36, which points to the start address of the submenu 33. The parameter IDs of those parameters, which should appear in the main menu 31, are stored in the remaining memory locations of the main menu 31. The parameter IDs of the parameters, which should appear in the submenus 32 and 33 are placed in the memory locations of the submenus 32 and 33.

Figure 6:
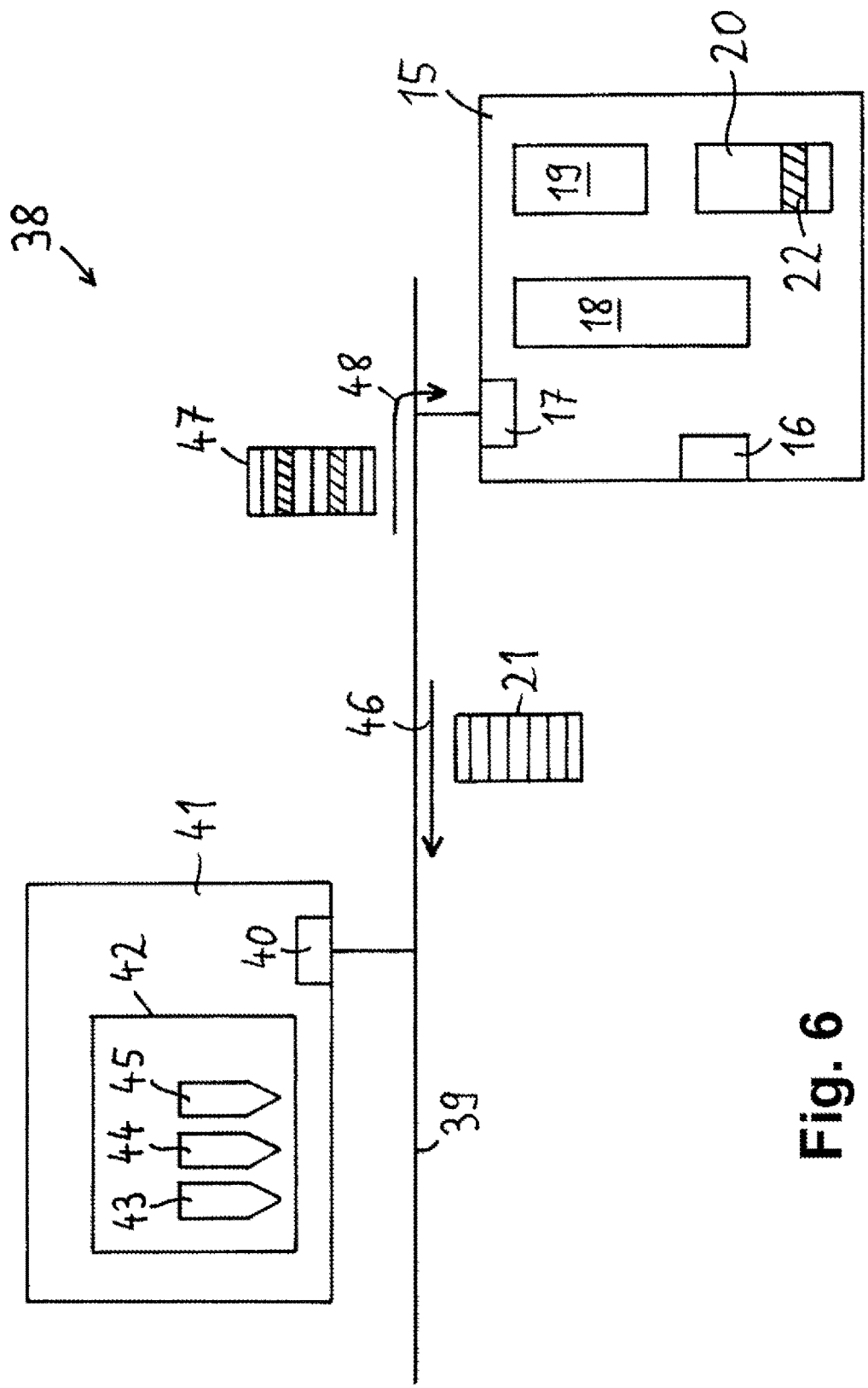
FIG. 6 the incorporation of a field device with a specifically compiled preference menu into a fieldbus system of the customer.

After the preference menu 21 has been stored in the EEPROM 20, the field device 15 depicted in FIG. 3 is delivered to the customer. The customer connects the newly acquired field device 15 to the fieldbus system 38 depicted in FIG. 6. The field device 15 is connected to the fieldbus 39 via the fieldbus interface 17. A host computer 41 is also connected to the fieldbus 39 via a fieldbus interface 40. Device connectivity software 42 is installed on the host computer 41, using which, the host computer 41 is able to access the field devices and other components connected to the fieldbus 39. Multiple device drivers or DTMs (Device Type Managers) 43, 44, 45, which are responsible for processing the communication with the different field devices and components of the fieldbus system, are connected into the device connectivity software 42, which is preferably designed in accordance with the FDT (Field Device Tool) standard. The function of the device drivers 43, 44, 45 can most likely be compared with the function of driver software. For example, the device driver 43 is responsible for communication with the field device 15. The device driver 43 accesses the field device 15 and initiates the transfer of the preference menu 21. Subsequently, the preference menu 21 stored in the memory area 22 of the EEPROM 20 is transferred from the field device 15 to the host computer 41 via the fieldbus 39, as shown by the arrow 46. The preference menu 21 is graphically displayed by the device driver 43 on the host computer 41. The menu structure depicted in FIG. 2 is displayed for the user on the display of the host computer 41, wherein the preference menu with the preferred parameters is displayed in a highlighted position.

According to a preferred embodiment, the customer has the option of modifying the preference menu displayed on the host computer 41 according to his wishes, using the host computer 41. In particular, the customer can add additional preferred parameters to the preference menu and/or delete parameters no longer required from the preference menu. In this manner, the customer can adapt the preference menu to his own requirements. After the customer has finished editing the preference menu, the amended preference menu 47 is transferred by the device driver 43 in the direction of the arrow 48 to the field device 15 via the fieldbus 39 and is stored here in the memory area 22 of the EEPROM 20. The amended preference menu 47 is now stored on the field device 15. The amended preference menu 47 used from now on for all future access to the field device 15. This also applies when the field device 15 is connected to another fieldbus system.

The preference menu 21 stored in the field device 15 can also be displayed on an on-site operator control module of the field device 15. The on-site operator control module comprises e.g. a display element and multiple operator controls. The user can modify the preference menu 21 of the field device 15 via the on-site operator control module by adding preferred parameters to the preference menu 21 and/or deleting these from the preference menu 21. The modified preference menu created in this manner is then, in turn, stored in the memory area 22 of the EEPROM 20.

The invention claimed is:

1. A method for creating a preference menu for a field device, wherein the field device can be parameterized and configured by means of a large number of parameters, wherein the method features:

compiling a device specification indicated by the customer at a purchase order for the field device and optionally other customer specifications as a preference menu, which comprises a selection of preferred parameters, which are particularly relevant to the respective device specification for the field device;

storing the preference menu with the selection of preferred parameters in a memory component of the field device;

readout of the preference menu from the field device via host computer, which is connected to the field device via a fieldbus;

transfer of the preference menu with a selection of preferred parameters from the field device to the host computer via the fieldbus; and display of the preference menu on the host computer using a device connectivity software.

2. The method in accordance with claim 1, characterized by at least one of the following:

the device specification for the field device indicated by the customer at the purchase order and, optionally, other customer specifications are compiled as the preference menu by the manufacturer on a production computer;

the device specification for the field device indicated by the customer at the purchase order and, optionally, other customer specifications are automatically compiled as the preference menu by the manufacturer on said production computer;

the preference menu is automatically created by the manufacturer of the field device on said production computer;

the preference menu is stored in a nonvolatile programmable memory of the field device; and the preference menu is stored in an EEPROM of the field device.

3. The method in accordance with claim 1, wherein:

the device specification and, optionally, other customer specifications are compiled as the preference menu by means of allocation protocols or allocation tables.

4. The method in accordance with claim 1, wherein:

the other customer specifications comprise at least one of the following:

information concerning an intended purpose of the field device;

information concerning an intended operation mode of the field device;

information concerning an intended range of measurement of the field device; and specification of parameters, which should be explicitly included in the preference menu.

5. The method in accordance with claim 1, wherein:

an order code used for ordering the field device, which unambiguously identifies the device specification ordered by the customer and, optionally, other customer specifications, is automatically compiled as the preference menu with a selection of preferred parameters suitable for the device specification.

6. The method in accordance with claim 5, wherein:

characterized by at least one of the following:

the order code is a series of numerals;

the order code is a series of alphanumeric characters; and the order code includes additional positions for indicating further customer specifications, which are also referred to when the order code is compiled as the preference menu.

7. The method in accordance with claim 1, wherein:

the preference menu comprises a list of parameter IDs, and the parameter IDs identify the parameters contained in the preference menu.

8. The method in accordance with claim 1, wherein:

the preference menu is designed as a structured menu, which includes one or more submenus.

9. The method in accordance with claim 8, wherein:

the preference menu is stored in the form of a linked list in the memory of the field device; and one or more pointers, which always point to a start address of submenu, are stored in at least one memory location of the preference menu.

10. The method in accordance with claim 1, characterized by at least one of the following:

the selection of preferred parameters contained in the preference menu is adapted to the respective device specification for the field device;

the selection of preferred parameters contained in the preference menu includes one or more setting parameters;

the selection of preferred parameters contained in the preference menu includes one or more display parameters;

the selection of preferred parameters contained in the preference menu includes both setting parameters and display parameters; and the selection of preferred parameters contained in the preference menu includes both setting parameters and display parameters, wherein the display parameters contained in the preference menu are summarized in a diagnosis submenu of the preference menu.

11. The method in accordance with claim 1, wherein:

the preference menu is displayed on an on-site operator control module of the field device.

12. The method in accordance with claim 1, characterized by the following steps:

modification of the preference menu by adding and/or deleting preferred parameters of the preference menu via an on-site operator control module of the field device; and storage of the modified preference menu in the memory of the field device.

13. The method in accordance with claim 1, characterized by the following steps:

modification of the preference menu by adding and/or deleting preferred parameters of the preference menu using device connectivity software, which is installed on the host computer;

transfer of a modified preference menu from the host computer to the field device via the fieldbus; and storing the modified preference menu in the memory of the field device.

14. A fieldbus system, which features:

a field device which can be parameterized and configured by means of a large number of parameters, wherein the field device features: a sensing element;

a fieldbus interface for connection to a fieldbus; and a programmable nonvolatile memory, wherein: a preference menu is stored in said programmable nonvolatile memory, which comprises a selection of preferred parameters, which are particularly relevant to said respective device specification for said field device;

said preference menu is generated as a suitable selection of preferred parameters for said respective device specification for said field device by means of compiling a device specification for said field device and optionally other customer specifications;

a host computer;

a fieldbus, to which said field device and said host computer are connected, wherein:

device connectivity software is installed on said host computer, with which said field device can be parameterized and configured via the fieldbus; and said device connectivity software installed on said host computer is designed to read out and display said preference menu from said field device, highlighted in a menu structure.

\* \* \* \* \*